United States Patent
Bharti et al.

(10) Patent No.: US 12,095,659 B2
(45) Date of Patent: *Sep. 17, 2024

(54) SERVICE CHAIN INSTANCE POOL SIZING

(71) Applicant: INTERNATIONAL BUSINESS MACHINES CORPORATION, Armonk, NY (US)

(72) Inventors: Harish Bharti, Pune (IN); Rajesh Kumar Saxena, Maharashtra (IN); Sandeep Sukhija, Rajasthan (IN); Deepak Bajaj, Leicester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,556

(22) Filed: Aug. 22, 2023

(65) Prior Publication Data
US 2023/0396535 A1   Dec. 7, 2023

Related U.S. Application Data

(63) Continuation of application No. 17/491,608, filed on Oct. 1, 2021, now Pat. No. 11,831,540.

(51) Int. Cl.
*H04L 45/302* (2022.01)
*H04L 41/5054* (2022.01)
(Continued)

(52) U.S. Cl.
CPC .......... *H04L 45/306* (2013.01); *H04L 67/562* (2022.05); *H04W 4/50* (2018.02); *H04W 48/18* (2013.01); *H04W 84/18* (2013.01)

(58) Field of Classification Search
CPC ..... H04L 45/302; H04L 45/306; H04L 67/56; H04L 67/562; H04W 4/50; H04W 48/18; H04W 84/18
See application file for complete search history.

(56) References Cited

U.S. PATENT DOCUMENTS 8,612,330 B1   12/2013   Certain et al.
8,694,400 B1   4/2014   Certain et al.
(Continued)

FOREIGN PATENT DOCUMENTS

CN   112506658 A   3/2021

OTHER PUBLICATIONS

Alleg, A., et al., "Delay-aware VNF Placement and Chaining based on a Flexible Resource Allocation Approach", Proc. of IEEE CNSM (2017), available at: <https://www.robertoriggio.net/papers/cnsm2017_delay_aware.pdf>, 9 pgs.

(Continued)

*Primary Examiner* — Jenee Holland
(74) *Attorney, Agent, or Firm* — Rakesh Roy, Esq.; Matthew M. Hulihan, Esq.; Heslin Rothenberg Farley & Mesiti P.C.

(57) ABSTRACT

A process for service chain instance pool sizing receives service requests for processing in a 5G network by a service function chain, of the 5G network, providing network function(s) to process the service requests. The method determines an average number of service requests to be processed, and determines a number of service chain instances to exist in a pool of service chain instances, of the service function chain, as a composite of (i) a number of instances to process service requests having arrived and making an initial relay through the service function chain and (ii) a number of instances to process service requests that were re-introduced after having previously arrived. The method additionally indicates the number of service chain instances to exist in the pool to a component responsible for controlling the number of service chain instances in the pool.

20 Claims, 5 Drawing Sheets

(51) Int. Cl.
*H04L 67/10* (2022.01)
*H04L 67/56* (2022.01)
*H04L 67/562* (2022.01)
*H04W 4/50* (2018.01)
*H04W 24/02* (2009.01)
*H04W 48/18* (2009.01)
*H04W 84/18* (2009.01)

(56) References Cited

U.S. PATENT DOCUMENTS

| | | |
|---|---|---|
| 8,818,973 B1 | 8/2014 | O'Neill |
| 9,678,773 B1 | 6/2017 | Wagner et al. |
| 9,830,193 B1 | 11/2017 | Wagner et al. |
| 10,212,097 B2 | 2/2019 | Mirahsan et al. |
| 10,361,969 B2 | 7/2019 | Bosch et al. |
| 10,454,888 B2 | 10/2019 | Meng et al. |
| 10,761,893 B1 | 9/2020 | Bhadauria et al. |
| 11,010,205 B2 | 5/2021 | Sharma |
| 11,184,283 B2 | 11/2021 | Eastlake, III |
| 11,570,043 B2 | 1/2023 | Kerboeuf et al. |
| 2015/0222640 A1* | 8/2015 | Kumar ............... H04L 47/125 370/230 |
| 2016/0179582 A1* | 6/2016 | Skerry ............... G06F 9/5027 718/1 |
| 2016/0182684 A1 | 6/2016 | Connor et al. |
| 2016/0246652 A1* | 8/2016 | Herdrich ............ G06F 9/5077 |
| 2016/0344803 A1 | 11/2016 | Batz et al. |
| 2017/0090961 A1 | 3/2017 | Wagner et al. |
| 2017/0104847 A1 | 4/2017 | Zhang et al. |
| 2017/0331906 A1 | 11/2017 | Choi et al. |
| 2018/0060136 A1* | 3/2018 | Herdrich ............ G06F 9/5077 |
| 2018/0063018 A1 | 3/2018 | Bosch et al. |
| 2018/0219735 A1 | 8/2018 | Di-Cairano-Gilfedder et al. |
| 2018/0349202 A1 | 12/2018 | Sharma et al. |
| 2019/0104076 A1 | 4/2019 | Seetharaman et al. |
| 2019/0190827 A1 | 6/2019 | Han et al. |
| 2019/0335002 A1* | 10/2019 | Bogineni ............... H04W 8/22 |
| 2019/0384647 A1 | 12/2019 | Reque et al. |
| 2020/0021518 A1 | 1/2020 | Yan et al. |
| 2020/0117605 A1* | 4/2020 | Cornett ............... H04L 49/9047 |
| 2020/0145336 A1 | 5/2020 | Shao |
| 2020/0195580 A1 | 6/2020 | Han et al. |
| 2020/0218512 A1* | 7/2020 | Chen ................... H04L 67/108 |
| 2020/0226009 A1 | 7/2020 | Bachmutsky et al. |
| 2020/0236035 A1 | 7/2020 | Zhang et al. |
| 2020/0366744 A1 | 11/2020 | Lin et al. |
| 2021/0021516 A1 | 1/2021 | Tao et al. |
| 2021/0028990 A1 | 1/2021 | Han et al. |
| 2021/0184988 A1 | 6/2021 | Anwer et al. |
| 2022/0029897 A1 | 1/2022 | Han et al. |
| 2022/0060370 A1 | 2/2022 | Gage et al. |
| 2022/0263771 A1 | 8/2022 | Anwer et al. |
| 2023/0024892 A1 | 1/2023 | de Oliveira Barbalho |
| 2023/0114682 A1 | 4/2023 | Bharti et al. |

OTHER PUBLICATIONS

Qu, L., et al., Abstract of "Delay-Aware Scheduling and Resource Optimization with Network Function Virtualization", IEEE Transactions on Communications, vol. 64, Issue: 9, Sep. 2016, available at <https://ieeexplore.ieee.org/abstract/document/7490404>, 2 pgs.

Mell, Peter, et al., "The NIST Definition of Cloud Computing", NIST Special Publication 800-145, Sep. 2011, Gaithersburg, MD, 7 pgs.

List of IBM Patents or Applications Treated as Related, dated Aug. 22, 2023, 2 pgs.

* cited by examiner

SERVICE CHAIN INSTANCE POOL SIZING

BACKGROUND

Connected network functions form service function chains (SFCs), also known as service chains. Network function virtualization (NFV) is an emerging powerful technique that decouples various network functions from hardware, allowing them to be virtualized. A virtual network function (VNF), for instance, runs as virtual machine(s) on servers that are organized to form a chain providing a service. During the build and deployment of a service chain, it can be provisioned on the service platform as virtualized service servers.

Service chains are developed for 5G telecommunications technology, also referred to herein as 5G, "5G NR", "New Radio", or just "NR", referring to fifth-generation radio access technology overseen by the 3rd Generation Partnership Project (3GPP) on the 5G core infrastructure, i.e. the "5G core" or "5GC". Service chains are resilient if built and provisioned on the same service platform/server(s), even if they are temporal and fungible. These services are agnostic, meaning they may or may not be dependent on each other in the handling of request. A data center can be provisioned with many service servers that are employed for handling/servicing requests. At any given point in time, all these servers are likely to be performing activities leading to marginal utilization in the deployed topology.

SUMMARY

Shortcomings of the prior art are overcome and additional advantages are provided through the provision of a computer-implemented method. The method receives service requests for processing in a 5G network by a service function chain of the 5G network. The service function chain provides one or more network functions to process the service requests. The method also determines an average number of service requests to be processed by the service function chain. The method determines a number of service chain instances to exist in a pool of service chain instances, of the service function chain, as a composite. Specifically, the composite is of (i) a first number of service chain instances to process service requests having arrived and making an initial relay through the service function chain and (ii) a second number of service chain instances to process service requests that were re-introduced after having previously arrived. The method additionally indicates the number of service chain instances to exist in the pool of service chain instances to a component responsible for controlling the number of service chain instances in the pool of service chain instances.

Further, a computer system is provided that includes a memory and a processor in communication with the memory, wherein the computer system is configured to perform a method. The method receives service requests for processing in a 5G network by a service function chain of the 5G network. The service function chain provides one or more network functions to process the service requests. The method also determines an average number of service requests to be processed by the service function chain. The method determines a number of service chain instances to exist in a pool of service chain instances, of the service function chain, as a composite. Specifically, the composite is of (i) a first number of service chain instances to process service requests having arrived and making an initial relay through the service function chain and (ii) a second number of service chain instances to process service requests that were re-introduced after having previously arrived. The method additionally indicates the number of service chain instances to exist in the pool of service chain instances to a component responsible for controlling the number of service chain instances in the pool of service chain instances.

Yet further, a computer program product including a computer readable storage medium readable by a processing circuit and storing instructions for execution by the processing circuit is provided for performing a method. The method receives service requests for processing in a 5G network by a service function chain of the 5G network. The service function chain provides one or more network functions to process the service requests. The method also determines an average number of service requests to be processed by the service function chain. The method determines a number of service chain instances to exist in a pool of service chain instances, of the service function chain, as a composite. Specifically, the composite is of (i) a first number of service chain instances to process service requests having arrived and making an initial relay through the service function chain and (ii) a second number of service chain instances to process service requests that were re-introduced after having previously arrived. The method additionally indicates the number of service chain instances to exist in the pool of service chain instances to a component responsible for controlling the number of service chain instances in the pool of service chain instances.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
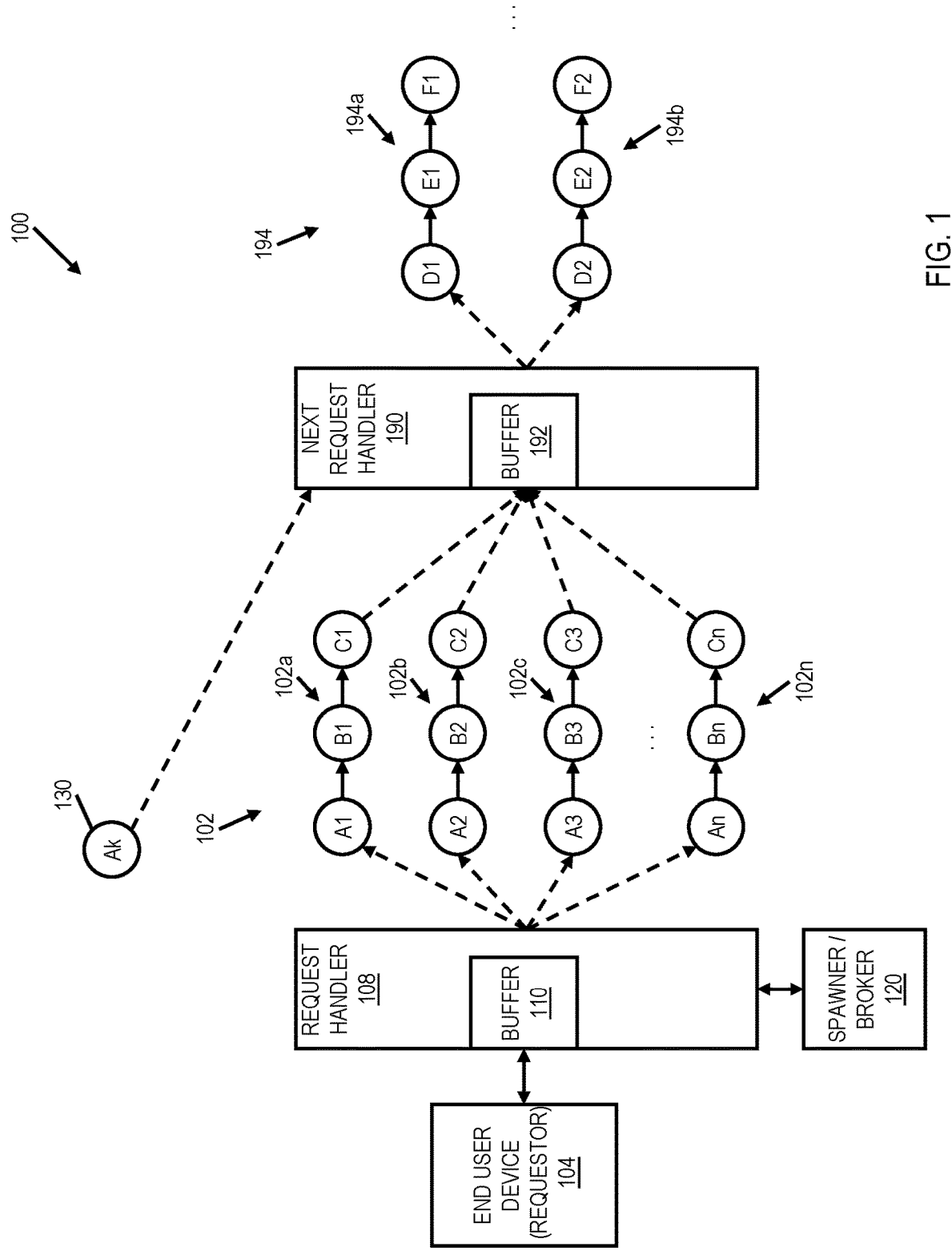
FIG. 1 depicts an example environment to incorporate and use aspects described herein.

Service chains (synonymously referred to herein as service function chains) may be such that specific server resources are needed to service certain types of requests. For instance, a function in a particular service chain might require a specific hardware resource or large number of processors cores for a short amount of time to process certain types of requests. One option to ensure continued availability and high service level is to provide a virtually unlimited amount of redundancy in resource availability but this is impractical due to costs and other reasons. As a result, there is a tradeoff between resource provisioning and delivered service level-fewer provisioned resources generally result in lower service quality.

Sometime service chains experience jitter, which is variance in latency/lag of service handling resulting from inappropriate or insufficient resource allocation/provisioning. Jitter results in variation in the service level delivered by a service chain (which can reflect a more general lower quality of service) and arises due to any of varying factors. One contributing factor is the number of requestors submitting service requests for handling. Some level of jitter might be acceptable (service levels in even normal conditions might present as a normal distribution), but too much jitter (defined based on a threshold, for example) is to be avoided because it can result in poor communication, poor data transmission, and other problems, which results in unsatisfied end-users/customers One way to address jitter is for broker/spawner components that instantiate service chain instances for the 5G network to adjust allocation/provision of service chain resources within the available service servers. Described herein are approaches for optimizing service chain instance provisioning by determining optimal instance counts and directing a 5G spawner component accordingly in situations of jitter. The spawner component can provision or de-provision (remove, spin-down, allow to terminate, etc.) service chain instances in response to the direction.

Additionally, aspects provide performance analysis of a pool-based service handling delay and current resource usage using random arrival rates that can change over time. Incoming service requests are queued for service processing by a pool of service chain instances. The requests are treated equally in terms of their priority relative to each other, which is to say that none of the subject requests that are queued for processing are considered higher priority than others. This pool of service chain instances is expanded and contracted based on factors such as average delay and the resource usage in order to address jitter due to inappropriate or insufficient allocation of resources (number of instances) for each service chain by the broker and address conflicts/competition/deadlock arising when multiple services requests are competing for service chain instances (i.e. number of requests exceeds the number of instances). In this manner, handler processing is allocated to focus on processing a workload/group of requests that can dynamically change rather than on processing individual requests individually as they arrive. Conflict resolution can be organized by identifying conflict participants (requests for transmission) and allocating separate resources for them for relay.

FIG. 1 depicts an example environment to incorporate and use aspects described herein. The environment 100 depicts a portion of a 5G infrastructure. A service function provided includes a sequence of functions A, B, and C (also referred to as "resources") arranged in a chain, and is thus a service function chain (or just "service chain"). In practice, a 5G network typically provides at least thousands of service functions implemented by various service function chains.

The service function 102 in the example of FIG. 1 is to service/process incoming service requests by passing each request through a chain of functions A, B, and C, which each perform respective processing on/for the service request. The delivered service produces some output (e.g. output from function C) that in this case is provided to a next entity (buffer 192 in this example). The service function 102 provides some function that itself might be a portion of a bigger, overall service function invoked by an end user device, such as a 5G client device. Consequently, a service chain might be a sub-chain of a larger service chain that includes potentially many sub-chains performing different functions to accomplish the overall function of the larger service chain. As an example, a function to send a text message might be implemented by a service function chain, C, that is composed of several different service function chains (i.e., sub-chains Sub1, Sub2, etc.). Accordingly, 'service function chain' as used herein could refer to a service chain that is a sub-chain of a larger service function chain.

To deliver the service function of a service function chain, one or more service chain instances are instantiated or 'spun-up' by a broker or 'spawner' component. Each service chain instance includes one or more function(s) that process a request in-sequence to provide the particular service offered by that service chain. Thus, using the example above, a given service chain instance of the service function/chain 102 has an instance of function A, an instance of function B, and an instance of function C. In FIG. 1, there are n number of service chain instances 102a, 102b, 102c, ..., 102n of the service chain 102 at this point in time. Each such service chain 102a, 102b, 102c, ..., 102n includes respective function instances for the A function, the B function, and the C function. For example, the instance 102a includes function instance $A_1$ to provide the function A, $B_1$ to provide the function B, and $C_1$ to provide function C. A corresponding function of different instances—$A_1$ of instance 102a and $A_2$ of instance 102b for example—are different instances of the same function (A). In addition, within a given service chain instance and for a particular function thereof, there may be any number (one or more) of instances of that particular function instance. Thus, there may be multiple instances of function A available to serve as $A_1$ of service chain instance 102a for a given request. When the service chain instance 102a is to process a request, an instance of function A is selected from a collection of available instances to serve as $A_1$ for that request to be processed along instance 102a. Similarly, function B of instance 102a ($B_1$) could be provided by any of one or more instances of function B. The instances available for a function of a specific service chain instance may not be shared among different service chain instances, therefore an instance of function A to serve as $A_1$ in service chain 102a would not be available to server as $A_2$ in service chain 102b.

As noted above, a server chain (such as 102) could be just one part (a sub-chain) of a larger service function chain that is composed of multiple sub-chains. In the example of FIG. 1, there is another sub-chain 194 that, together with sub-chain 102, could form a larger service chain for performing a service function composed of the individual functions offered by 194 and 102 (and possibly others).

A virtual network function (VNF) refers to a set of one or more functions provided to requestors (such as client/end-user devices). Using FIG. 1 as an example, one available VNF might be the A function itself, another might be a chain of functions (such as the chain A, B, C, i.e. service chain 102), and yet another might be collection of individual service chains (e.g. sub-chains 102, 194) that are chained together to form an aggregate chain.

Service requests originate from requestors-end-user devices referred to as user endpoints (UEs) in 5G technology. UE 104 is depicted in FIG. 1 to represent the one or more requestors sending service requests. In practice, there may be many requestor UEs (hundreds, thousands, etc.) at any point in time for the particular service function provided by 102. In accordance with aspects presented herein, service request(s) are provided to a request handler 108 that is implemented by software executing on one or more hardware systems. In some examples, the request handler is a cloud service and virtualized, for instance in/as a virtual machine executing on hardware. Request handler 108 includes a buffer 110 into which the service requests enter. The service requests are to be processed, meaning passed to a service chain instance for processing through functions A, B, C. In this example, the service request is then passed onto a next request handler 190 with buffer 192, that next request handler 190 to pass the request onto a next service chain (sub-chain) 194 with functions D, E, and F, i.e. implemented by instances 194a or 194b in this example. The particular service provided by sub-chains 102 and 194, and by the combination of them, could be any service available to UEs.

With respect to service function 102, the corresponding request handler 108 receives incoming requests for that service function and the requests are placed into buffer 110. The rate at which requests arrive ("arrival rate") can be modeled. The handler 108 handles the requests by providing them to a pool of service chain instances ($102a, \ldots, 102n$). In contrast to a conventional orchestrator component that merely places requests onto selected queues, for instance on a first come, first served or first-in, first-out basis, handler 108 in accordance with aspects described herein facilitates the management of the instance pool by the spawner component 120 responsible for maintenance of the instance pool. This management is accomplished by optimizing the number of instances for the spawner 120 to provide. In particular, the request handler determines an optimal number of service chain instances for the pool in order to address jitter, either actual or predicted. This pool of service chain instances is referred to as a jitter pool. The optimization can reduce the average time that requests spend in the buffer 110. In an ideal situation, the number of service chain instances at any point in time would match the number of requests in the buffer so that time spent in the queue is zero while at the same time there is also no excess processing capacity provisioned (which is a resource waste). Factors including the time associated with instantiating a new service chain instance (bringing/spinning up the instance) or winding down instances can present difficulties in the endeavor to provide the ideal number of instances to match the volume of service requests at any given point in time.

In some aspects, as described in further detail below, a process estimates a number of active requestors/requests and understands how much time the requests will take to progress through functions A, B, and C. It is generally known how long it takes to bring-up a service instance and how many requests will be active (in the queue and flowing through the service chain before completion of function C) can be modeled. This is put together to determine probabilities that given numbers of service chain instances will satisfy given service workload levels in order to arrive at an optimal number of service chain instances are to exist in the pool at any given point in time. The request handler 108 can indicate this to the spawner component 120 and the spawner 120 can take appropriate action, for instance to provision/ instantiate additional service chain instances to the pool or deprovision instances to reduce the number in the pool.

These aspects are performed for a given service chain (e.g., sub-chain 102) through which requests from a given request handler (e.g., 108) are processed. It is possible to implement this analogously at other request handlers (e.g., 190) that buffer for other sub-chains (e.g., 194) as well. The different sub-chains may or may not be provided by the same spawner.

There are various causes of jitter, one of which occurs when different requestors send requests to an interlock point (handler) via different service chains. An example of this is shown in FIG. 1 with respect to jitter experienced with chain 194. Function $A_k$ 130, a single-resource service chain, provides requests to request handler 190 as does service chain 102 via instances $102a, \ldots, 102n$. This results in fragmentation, referring to unpredictability in request arrivals (rate and volume) at the handler 190. Jitter can result across the service function 194, creating drops, disruptions, and unpredictability that can compound to downstream chains.

Aspects described herein handle jitter at interlock/handler points via provision of a pool ("jitters pool") of service chain instances. The requests received at an interlock point are considered equal in terms of priority and without regard to their origin. A model is produced based on Little's Law that states that the long-term average number L of requests/ requestors in a stationary system is equal to the long-term average effective arrival rate ($\lambda$) multiplied by the average time (W) that a request spends in the system—$L=\lambda W$. Requests to a request handler arrive from requestors (perhaps via other functions/chains between the requestor and the handler) for handling. Aspects described herein create a discrete active Markov chain and solve it to determine a number of current 'active requests'. This can be used to resolve conflicts, referring in this sense to having more requestors requesting services at a current time than a current number of instances to service them, and avoid deadlock.

In accordance with aspects of the model, n represents a number active requestors, which is to say that each have a submitted a request to service via the service chain and the request remains active, meaning it is not yet completed. These active requests might be in various stages of servicing, for instance a stage of waiting (sitting in the buffer) or a stage of being processed in the service chain up to completion. Once a request is received by the handler, it is immediately available to be deployed onto a service chain instance without any pre-processing needed. The size of the buffer is not limited, so there are no request rejections on account of buffer size. Additionally, as long as there is at least one request in the buffer waiting to be serviced by a service instance, then a request is always ready to be deployed when a service chain instance is made available (there is no latency in deploying a request to an available servicer).

Service chains optimized by the model may be data service chains, dealing with data service requests, as opposed to other types of service chains such as those for control service requests (providing control) and/or feedback service requests (providing feedback).

It is assumed that the probability of error in the service chain's handling of requests is the same and equal for requests of requestors.

As noted above, the model seeks to optimize a number of service chain instances for the pool. To determine the average number of active requestors in the system, the stationary distribution (snapshot at any point in time) of the Markov chain is determined. If a service error occurs in the queuing system, the job (request) is returned to the queue (buffer) for re-processing, essentially resetting the request status to the arrival state of waiting in the buffer. The number of active requests in the system is taken as equivalent to the number of active requestors, i.e. those having presented a request for relay (initial or re-processed) that is still being serviced and is not yet completed. Completion refers in the case of service chain 102 to completion of processing the request by function C, as the request is the provided to a next entity for processing—here it is next handler 190. It is also noted that a request cannot be in two states at the same time—it is either in a wait state in the queue or a servicing state of discrete network functions on a service chain instance.

Application of the model to optimize service chain instance count helps avoid cascading deadlock within one service function to dependent service function(s), advantageously smoothing service level at the interlocks between the service sub-chains. Aspects therefore address undesirable jitter to provide more predictable timing to relay requests through the subject service chain. This in turn provides more predictability in terms of the timing of the overall progression of the request through connected service chains. Referring to FIG. 1, sub-chain 194 is dependent on sub-chain 102 in that sub-chain 194 cannot start processing a service request from sub-chain 102 until the service request is serviced by sub-chain 102 and function C completes for that request. Latency in request arrival at 190 from function C will cascade to handler 190 and will compound with any jitter experienced in chain 194, leading to potentially significant problems.

An example model to achieve aspects described herein to provide a jitter pool framework is as follows. Initially, the following measures/terms (many of which are instantaneous for a given point in time) are defined:

$S_p$ represents a fixed size of requests and $\lambda$ represents the arrival rate (exponentially distributed intervals). The requests of fixed size $S_p$ arrive at the request handler buffer at intervals distributed exponentially with parameter k;

$\bar{\lambda}$ simulates the intensity of the input stream;

n is the number of the active requests in the system;

$\bar{N}$ is the historical average of the number of active requests in the system since the service server/node has been up;

T is the average processing time to process/service a request in the system;

$N_{new}$ is the number of new active requests. These are requests that entered the buffer from outside the system and are on their initial relay, as opposed to having been being re-introduced as a result of a failure. $N_{new}$ is contrasted with $N_{reTx}$ which is the number of active requests not on their initial relay, i.e. have been re-introduced to the buffer for re-processing on account of some prior failure;

$N_{ReTx}{}^{in}$ and $N_{ReTx}{}^{in}$ are transitionary states (of "in" and "out", respectively) of the re-introduced requests;

$N_{new}{}^{in}$ and $N_{new}{}^{out}$ are transitionary states (of "in" and "out", respectively) of the new active requests;

$S_n$ is the state of the system at a current time;

$S^{out}$ and $S^{in}$ are transitionary states of "out" and "in" phases, respectively;

$D_s$ is link duration (the normal value for the service chain in terms of time the link takes to perform its service);

$PRB_{CB}$ is the number of service chain instances/resource interlocks allocated for jitter-pool-based service requisition for the service chain;

$\overline{PRB_S}$ is the desired number of service chain instances to include in the pool taken across all probabilities;

T is the average request delay (time spent in the queue);

$\pi$ is the stationary distribution of the Markov Chain; and $S^k$ refers to the individual state S out of 'k' possible states of the stationary distribution, as an instance can be spawned in 'k' ways To calculate the average number of active requests in the system, a representation of the queuing system is presented in the form of a discrete Markov chain with its different states that can probabilistically be acquired by the system at any time t given by a pair of numbers $N_{new}$, $Nr_{eTx}$, with $$N_{reTx} + N_{new} \leq n \qquad (Eq.\ 1)$$

This informs the possible number of requests that can cause undesirable jitter.

While, for $N_{new}{}^{in} > 1$, setting these into transition probabilities we can confound them into system states $S^{in}$ and $S^{out}$:

$$Pr\{S^{out}|S^{in}\}_{N_{new}^{in}>1} \qquad (Eq.\ 2)$$

$$\begin{cases} \binom{N_{err}}{N_{ReTx}^{in}} p^{N_{err}}(1-p)^{N_{ReTx}^{in}-N_{err}} \cdot \binom{N_{new}^{out}}{n-N_{ReTx}^{out}} q^{N_{new}^{out}}(1-p)^{n-N_{ReTx}^{out}-N_{new}^{out}} \\ 0 \end{cases}$$

where $$N_{err} = \min\left(\{N_{ReTx}^{out} - N_{new}^{in}\}, N_{ReTx}^{in}\right) \qquad (Eq.\ 3)$$

and a non-zero condition of (Eq. 2) will exist if $$\wedge_{\forall N}\{N_{ReTx}{}^{out} \geq N_{new}{}^{in}, N_{new}{}^{out} \leq (N_{ReTx}{}^{in} + N_{new}{}^{in})\} \qquad (Eq.\ 4)$$

Eq. 2 captures all possible transitions achievable by system, so that the solution is exhaustive and all inclusive. Eq. 3 provides the minimum and sufficient condition to provide a solution for the jitter pool.

While, for $N_{new}{}^{in} \leq 1$, setting these into transition probabilities, we can confound them into system states $S^{in}$ and $S^{out}$:

$$Pr\{S^{out}|S^{in}\}_{N_{new}^{in}>1} \begin{cases} \binom{N_{ReTx}^{out}}{N_{ReTx}^{in}+N_{New}^{in}} p^{N_{ReTx}^{out}}(1-p)^{N_{ReTx}^{in}+N_{New}^{in}-N_{ReTx}^{out}} \cdot \binom{N_{new}^{out}}{n-N_{ReTx}^{out}} q^{N_{new}^{out}}(1-p)^{n-N_{ReTx}^{out}-N_{new}^{out}} \\ 0 \end{cases} \qquad (Eq.\ 5)$$

where $N_{new}^{out} \leq (N_{ReTx}^{in} - N_{new}^{in})$.

Eq. 5 determines the state of system when congestion is likely.

The Markov chain describing the simplified model is represented by the set S of states as:

$$S_n = \{(N_{ReTx}^i, N_{new}^i) | N_{ReTx}^i + N_{new}^i \leq n\} \quad \text{(Eq. 6)}$$

To determine the average number of active requests in the system, the process determines the stationary distribution $\pi$ of the Markov chain as:

$$\{\pi = (Pr\{S^1\}, Pr\{S^2\}, .Pr\{S^i\}..Pr\{S^k\})\}_{S^i \in S_n, k=\frac{n^2}{2}} \quad \text{(Eq. 7)}$$

The average number of requests in the system is determined as:

$$\bar{N} = \sum_{S^i \in S_n}^{S^i = \frac{n^2}{2}} [Pr\{S^i\}, \{N_{ReTx}^i + N_{New}^i\}] \quad \text{(Eq. 8)}$$

Once probability/likelihood is known from Eq. 7, Eq. 8 defines the number of requests for processing.

The intensity of the input stream ($\bar{\lambda}$) is taken as the average number of requests for initial relay:

$$\bar{\lambda} = \sum_{S^i \in S_n}^{S^i = \frac{n^2}{2}} [Pr\{S^i\}, \{N_{new}^i\}] \quad \text{(Eq. 9)}$$

This indicates how many requests are waiting for service. A request that appeared in the link can participate in relay only in the next link. Therefore, each request on average expects 0.5 link duration in addition because when identifying a request, its response is broken into 2 parts/frames and what is identified in the first frame is only processed in the second frame. As a result, the following expression represents request delay (waiting time, which becomes experienced latency, $$\tau = \left(\frac{\bar{N}}{\bar{\lambda}} + 0.5\right) D_S \quad \text{(Eq. 10)}$$

Eq. 10 determines the waiting time and can be used as a standard for wait time.

The desired number of service chain instances to include in the pool taken across all probabilities is composed of the number of resources (service chain instances) for jitter-pool-based initial relay and the number of resources allocated to requestors who need a relay, i.e. allocated to requests that have been re-introduced into the queue on account of some failure in processing them previously:

$$\overline{PRB_S} = \sum_{S^i \in S_n}^{S^i = \frac{n^2}{2}} [Pr\{S^i\}, \{1 + N_{ReTx}^i\}, PRB_{CB}] \quad \text{(Eq. 11)}$$

Eq. 11 defines how to manage the jitter pool of service chain instances (i.e. informs the count) to best service requests in order to reduce jitter.

Figure 2:
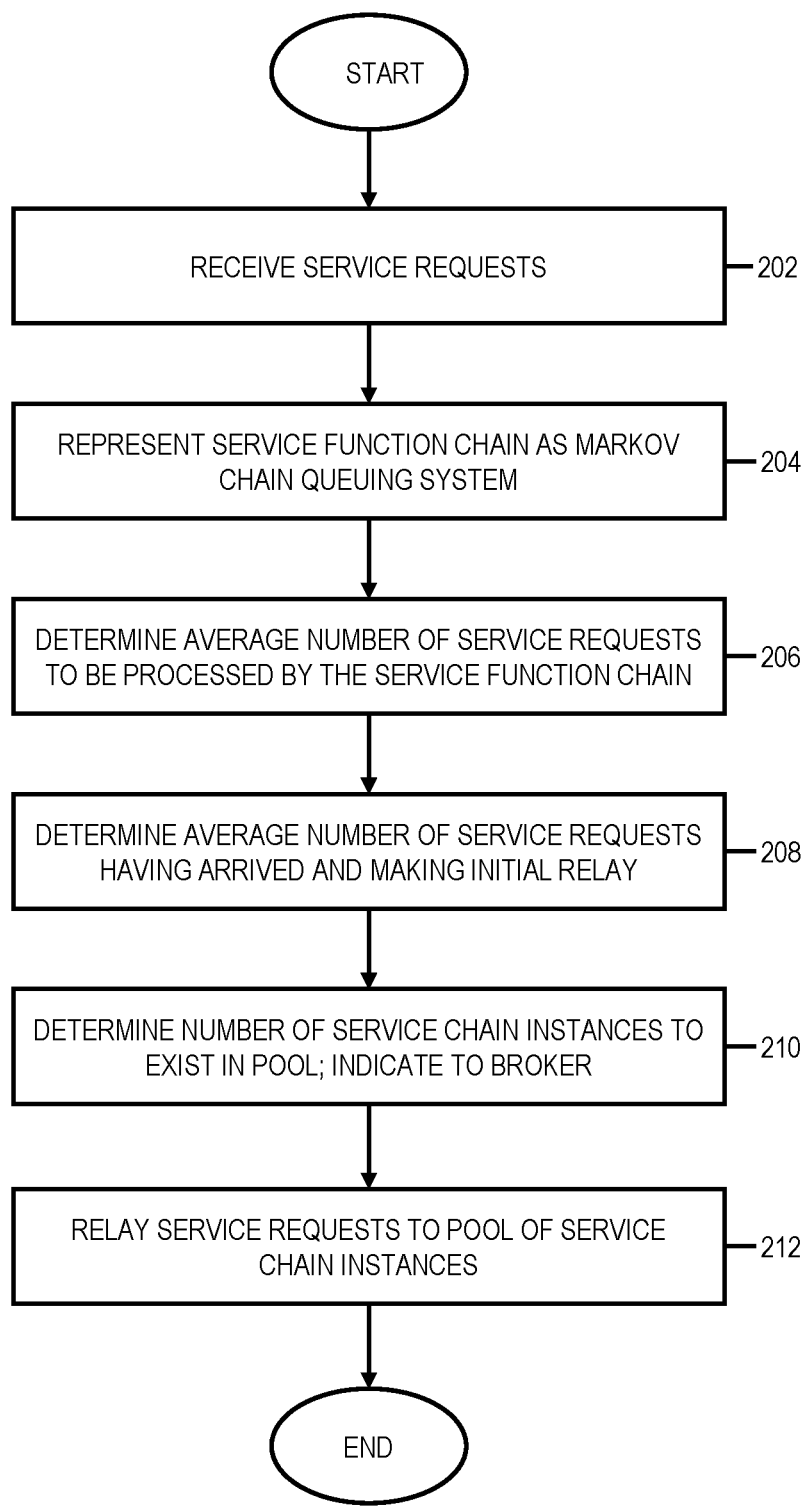
FIG. 2 depicts an example process for service chain instance pool sizing, in accordance with aspects described herein.

FIG. 2 depicts an example process for service chain instance pool sizing, in accordance with aspects described herein. In some examples, the process is performed by one or more computer systems, such as those described herein, which may include a request handler implemented on one or more computer systems of a 5G network, one or more cloud servers, and/or one or more other computer systems.

The process begins by receiving (202) service requests, communicated in a 5G network, into a buffer of a request handler of the 5G network. The service requests are for processing in the 5G network by a service function chain of the 5G network. The service function chain provides one or more network functions to process the service requests, and wherein the request handler is configured to relay received service requests to a pool of service chain instances of the service function chain. The process represents (204) the service function chain as a Markov chain queueing system having states defined by (i) a number of service requests having arrived at the buffer and making an initial relay through the service function chain and (ii) a number of service requests that were re-introduced into the buffer after having previously arrived.

The process also determines (206) an average number of service requests to be processed by the service function chain. Determining this average number of service requests to be processed by the service function chain includes determining a stationary distribution of the Markov chain. The process also determines (208) an average number of service requests having arrived at the buffer and making an initial relay through the service function chain. The process determines (210) a number of service chain instances to exist in the pool, e.g., as a composite of a first number of service chain instances to process service requests having arrived at the buffer and making an initial relay through the service function chain and a second number of service chain instances to process service requests that were re-introduced into the buffer after having previously arrived, and indicates this number of service chain instances to exist to a broker component that controls the number of service chain instances in the pool of service chain instances. In examples, the broker component takes that indicated number of scales the size of the pool (number of service chain instances) by adding or removing instances therefrom to match the indicated number.

The method also includes relaying (212) the service requests to the pool of service chain instances. This relaying could occur at least partially before, during, and/or after the pool is scaled in response to the indicating.

In examples, this process is repeated for other request handlers sitting in front of other service function chains. For instance, the service function chain discussed above with respect to FIG. 2 could be one sub-chain of network functions in a serially connected plurality of sub-chains of network functions. The request handler could therefore be a first request handler to receive and relay the service requests to the pool of service chain instances of the one sub-chain. A second request handler, different from the first request handler, can exist to receive and relay service requests (such as those discussed above at 202 and/or other service requests) to a pool of service chain instances of another sub-chain of the plurality of sub-chains. The process could further include repeating FIG. 2 with respect to the another request handler and another sub-chain, e.g., repeat by the another request handler, for the another sub-chain, the receiving the service requests (202), the determining an average number of service requests to be processed by the another sub-chain (204), the determining a number of service chain instances to exist in the pool of service chain instances of the another sub-chain (208), and the indicating, to another broker component controlling a number of service chain instances in the pool of service chain instances of the another sub-chain, the number of service chain instances to exist in the pool of service chain instances of the another sub-chain (210).

Although various examples are provided, variations are possible without departing from a spirit of the claimed aspects.

Figure 3:
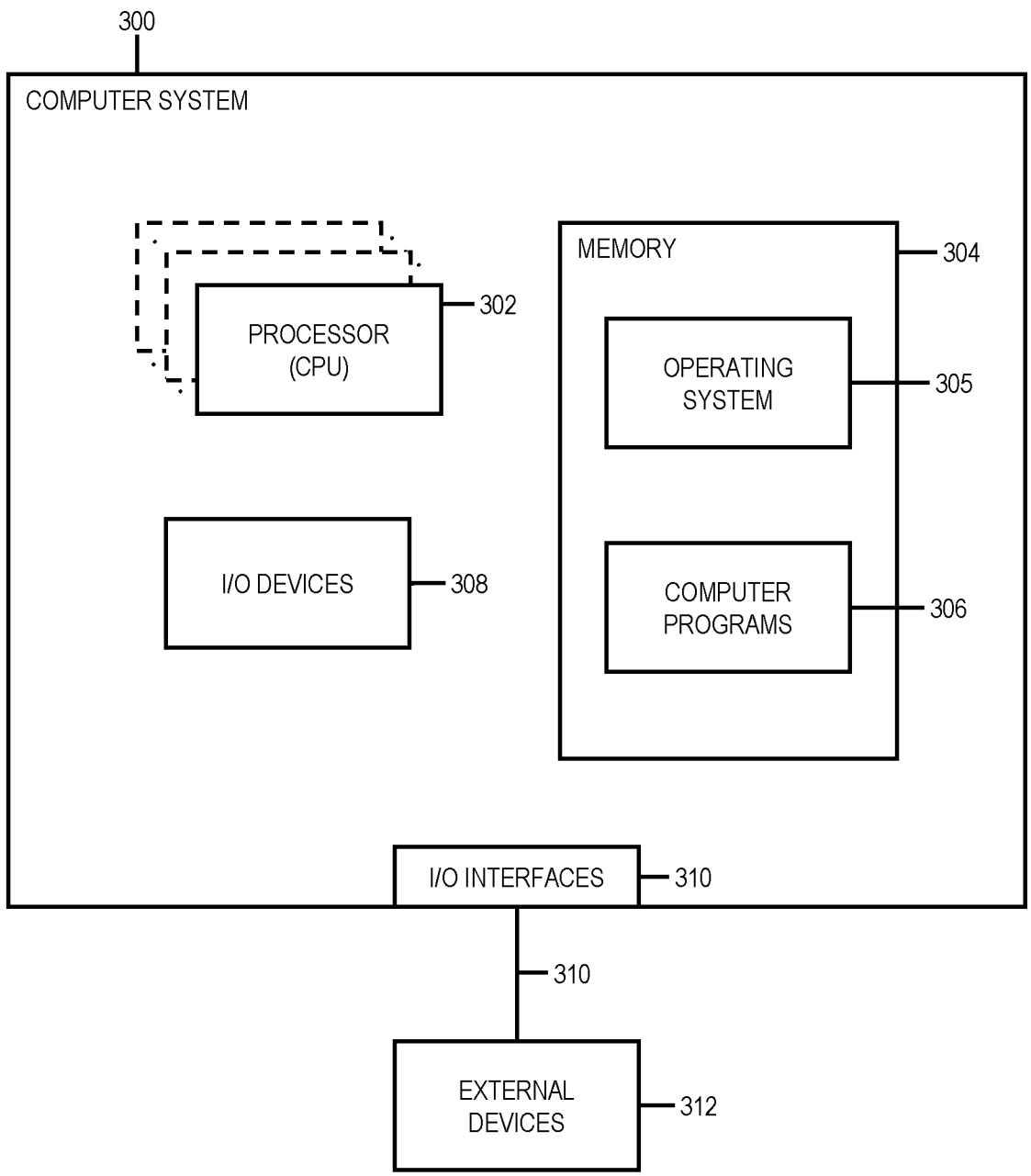
FIG. 3 depicts one example of a computer system and associated devices to incorporate and/or use aspects described herein.

Processes described herein may be performed singly or collectively by one or more computer systems, such as one or more computer systems implementing one or more request handlers, as examples. FIG. 3 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 3 shows a computer system 300 in communication with external device(s) 312. Computer system 300 includes one or more processor(s) 302, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 302 can also include register(s) to be used by one or more of the functional components. Computer system 300 also includes memory 304, input/output (I/O) devices 308, and I/O interfaces 310, which may be coupled to processor(s) 302 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 304 can be or include main or system memory (e.g. Random Access Memory) used in the execution of program instructions, storage device(s) such as hard drive(s), flash media, or optical media as examples, and/or cache memory, as examples. Memory 304 can include, for instance, a cache, such as a shared cache, which may be coupled to local caches (examples include L1 cache, L2 cache, etc.) of processor(s) 302. Additionally, memory 304 may be or include at least one computer program product having a set (e.g., at least one) of program modules, instructions, code or the like that is/are configured to carry out functions of embodiments described herein when executed by one or more processors.

Memory 304 can store an operating system 305 and other computer programs 306, such as one or more computer programs/applications that execute to perform aspects described herein. Specifically, programs/applications can include computer readable program instructions that may be configured to carry out functions of embodiments of aspects described herein.

Examples of I/O devices 308 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (312) coupled to the computer system through one or more I/O interfaces 310.

Computer system 300 may communicate with one or more external devices 312 via one or more I/O interfaces 310. Example external devices include a keyboard, a pointing device, a display, and/or any other devices that enable a user to interact with computer system 300. Other example external devices include any device that enables computer system 300 to communicate with one or more other computing systems or peripheral devices such as a printer. A network interface/adapter is an example I/O interface that enables computer system 300 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 310 and external devices 312 can occur across wired and/or wireless communications link(s) 311, such as Ethernet-based wired or wireless connections. Example wireless connections include cellular, Wi-Fi, Bluetooth®, proximity-based, near-field, or other types of wireless connections. More generally, communications link(s) 311 may be any appropriate wireless and/or wired communication link(s) for communicating data.

Particular external device(s) 312 may include one or more data storage devices, which may store one or more programs, one or more computer readable program instructions, and/or data, etc. Computer system 300 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 300 may be operational with numerous other general purpose or special purpose computing system environments or configurations. Computer system 300 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
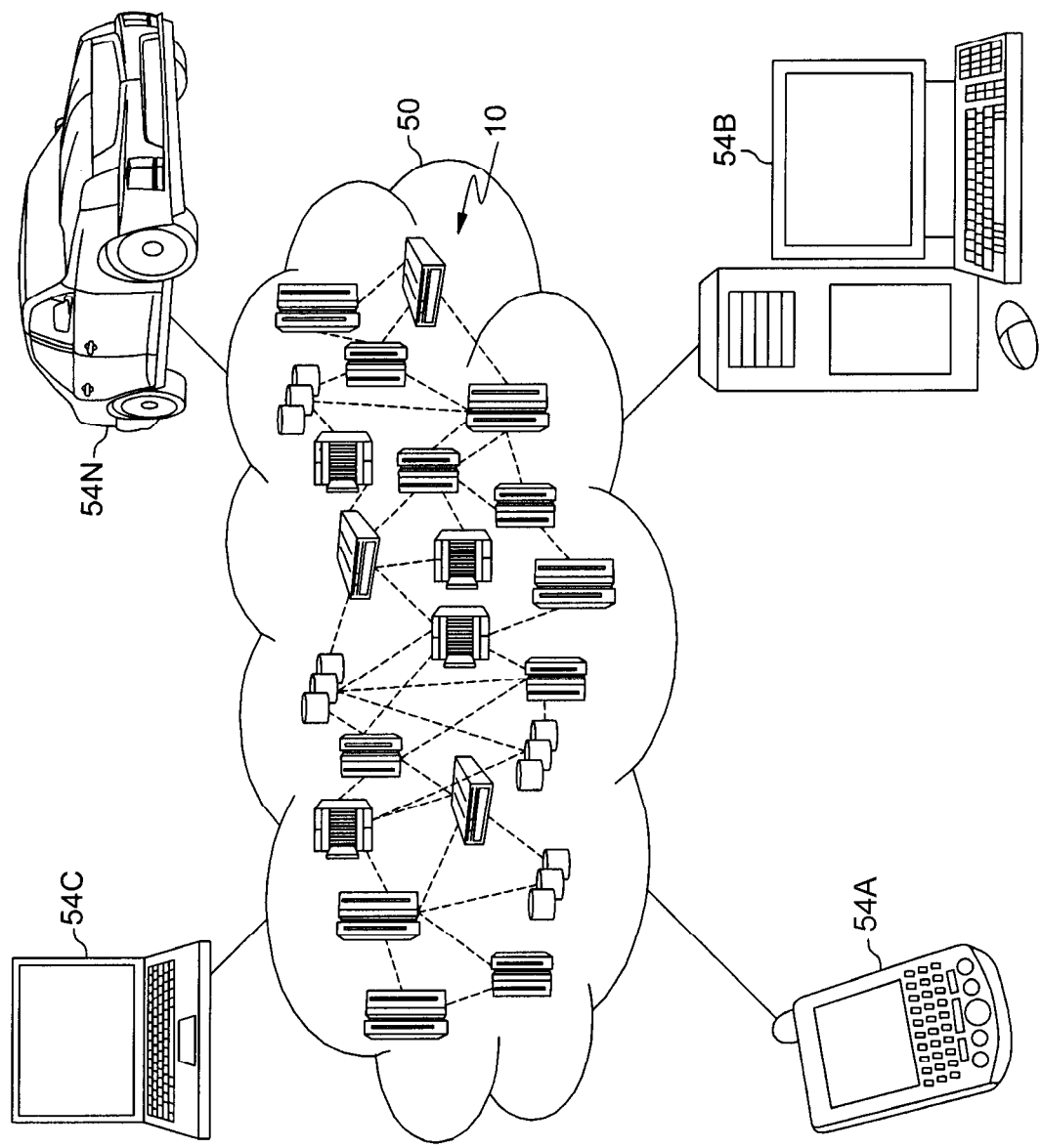
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
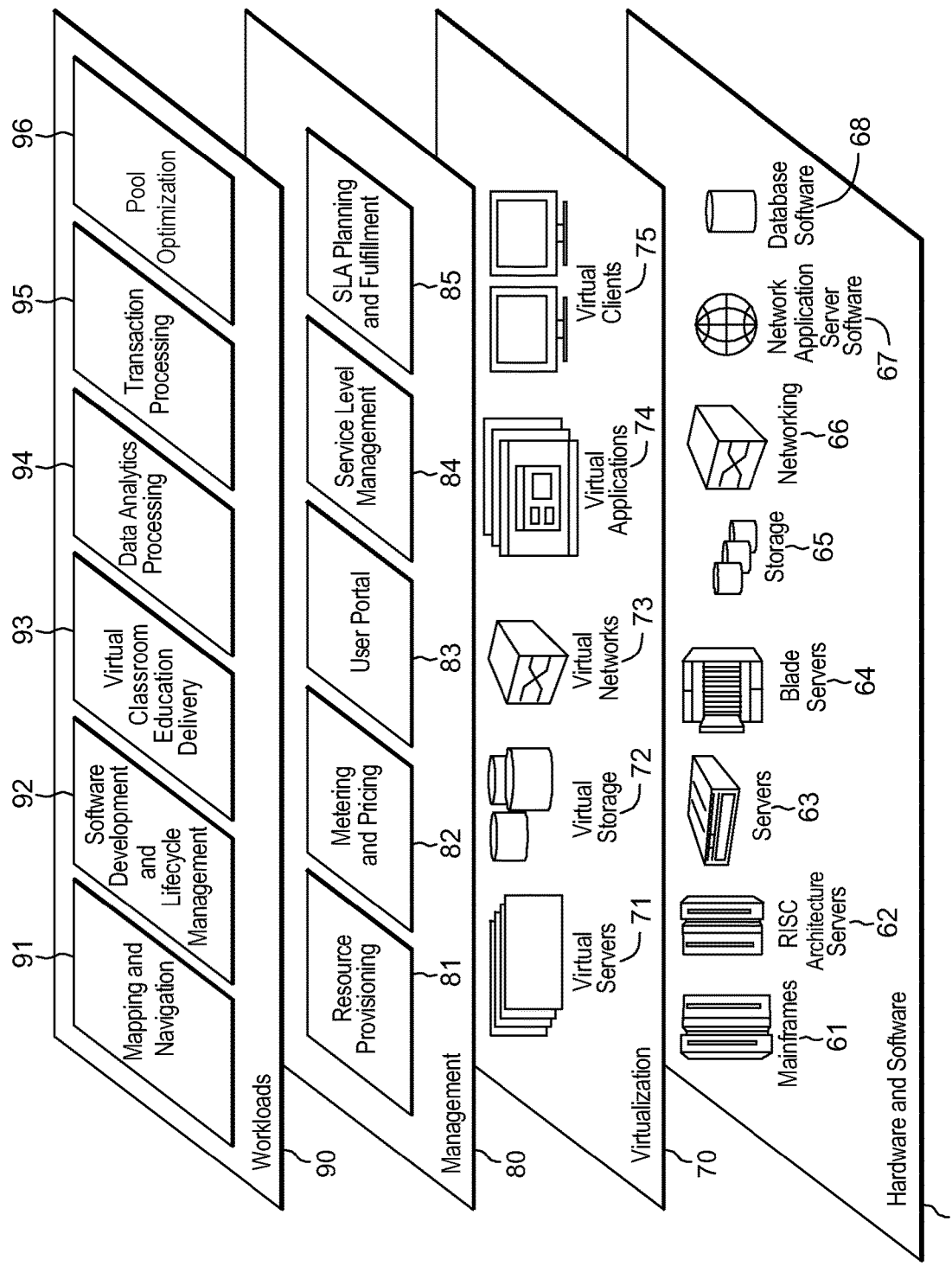
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service chain instance pool size optimization 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
receiving service requests for processing in a 5G network by a service function chain of the 5G network, the service function chain providing one or more network functions to process the service requests;
determining an average number of service requests to be processed by the service function chain;
determining a number of service chain instances to exist in a pool of service chain instances, of the service function chain, as a composite of a first number of service chain instances to process service requests having arrived and making an initial relay through the service function chain and a second number of service chain instances to process service requests that were re-introduced after having previously arrived; and
indicating the number of service chain instances to exist in the pool of service chain instances to a component responsible for controlling the number of service chain instances in the pool of service chain instances.

2. The method of claim 1, further comprising representing the service function chain as a Markov chain queueing system having states defined by (i) a number of service requests having arrived at a buffer and making an initial relay through the service function chain and (ii) a number of service requests that were re-introduced into the buffer after having previously arrived.

3. The method of claim 2, wherein determining the average number of service requests to be processed by the service function chain comprises determining a stationary distribution of the Markov chain.

4. The method of claim 1, further comprising determining an average number of service requests having arrived and making an initial relay through the service function chain.

5. The method of claim 1, further comprising relaying the received service requests to the pool of service chain instances.

6. The method of claim 1, wherein the service function chain is one sub-chain of network functions in a sequence of a plurality of sub-chains of network functions, wherein a first request handler receives and relays the service requests to the pool of service chain instances of the one sub-chain, and wherein a second request handler, different from the first request handler, is to receive and relay the service requests to a pool of service chain instances of another sub-chain of the plurality of sub-chains.

7. The method of claim 6, further comprising repeating, by the second request handler, for the another sub-chain, the (i) receiving service requests, (ii) determining an average number of service requests to be processed by the another sub-chain, (iii) determining a number of service chain instances to exist in the pool of service chain instances of the another sub-chain, and (iv) indicating the number of service chain instances to exist in the pool of service chain instances of the another sub-chain.

8. A computer system comprising:
a memory; and
a processor in communication with the memory, wherein the computer system is configured to perform a method comprising:
receiving service requests for processing in a 5G network by a service function chain of the 5G network, the service function chain providing one or more network functions to process the service requests;
determining an average number of service requests to be processed by the service function chain;
determining a number of service chain instances to exist in a pool of service chain instances, of the service function chain, as a composite of a first number of service chain instances to process service requests having arrived and making an initial relay through the service function chain and a second number of service chain instances to process service requests that were re-introduced after having previously arrived; and
indicating the number of service chain instances to exist in the pool of service chain instances to a component responsible for controlling the number of service chain instances in the pool of service chain instances.

9. The computer system of claim 8, wherein the method further comprises representing the service function chain as a Markov chain queueing system having states defined by (i) a number of service requests having arrived at a buffer and making an initial relay through the service function chain and (ii) a number of service requests that were re-introduced into the buffer after having previously arrived.

10. The computer system of claim 9, wherein determining the average number of service requests to be processed by the service function chain comprises determining a stationary distribution of the Markov chain.

11. The computer system of claim 8, wherein the method further comprises determining an average number of service requests having arrived and making an initial relay through the service function chain.

12. The computer system of claim 8, wherein the method further comprises relaying the received service requests to the pool of service chain instances.

13. The computer system of claim 8, wherein the service function chain is one sub-chain of network functions in a sequence of a plurality of sub-chains of network functions, wherein a first request handler receives and relays the service requests to the pool of service chain instances of the one sub-chain, and wherein a second request handler, different from the first request handler, is to receive and relay the service requests to a pool of service chain instances of another sub-chain of the plurality of sub-chains.

14. The computer system of claim 13, wherein the method further comprises repeating, by the second request handler, for the another sub-chain, the (i) receiving service requests, (ii) determining an average number of service requests to be processed by the another sub-chain, (iii) determining a number of service chain instances to exist in the pool of service chain instances of the another sub-chain, and (iv) indicating the number of service chain instances to exist in the pool of service chain instances of the another sub-chain.

15. A computer program product comprising:
a computer readable storage medium readable by a processing circuit and storing instructions for execution by the processing circuit for performing a method comprising:
receiving service requests for processing in a 5G network by a service function chain of the 5G network, the service function chain providing one or more network functions to process the service requests;
determining an average number of service requests to be processed by the service function chain;
determining a number of service chain instances to exist in a pool of service chain instances, of the service function chain, as a composite of a first number of service chain instances to process service requests having arrived and making an initial relay through the service function chain and a second number of service chain instances to process service requests that were re-introduced after having previously arrived; and
indicating the number of service chain instances to exist in the pool of service chain instances to a component responsible for controlling the number of service chain instances in the pool of service chain instances.

16. The computer program product of claim 15, wherein the method further comprises representing the service function chain as a Markov chain queueing system having states defined by (i) a number of service requests having arrived at a buffer and making an initial relay through the service function chain and (ii) a number of service requests that were re-introduced into the buffer after having previously arrived.

17. The computer program product of claim 16, wherein determining the average number of service requests to be processed by the service function chain comprises determining a stationary distribution of the Markov chain.

18. The computer program product of claim 15, wherein the method further comprises relaying the received service requests to the pool of service chain instances.

19. The computer program product of claim 15, wherein the service function chain is one sub-chain of network functions in a sequence of a plurality of sub-chains of network functions, wherein a first request handler receives and relays the service requests to the pool of service chain instances of the one sub-chain, and wherein a second request handler, different from the first request handler, is to receive and relay the service requests to a pool of service chain instances of another sub-chain of the plurality of sub-chains.

20. The computer program product of claim 19, wherein the method further comprises repeating, by the second request handler, for the another sub-chain, the (i) receiving service requests, (ii) determining an average number of service requests to be processed by the another sub-chain, (iii) determining a number of service chain instances to exist in the pool of service chain instances of the another sub-chain, and (iv) indicating the number of service chain instances to exist in the pool of service chain instances of the another sub-chain.

* * * * *